Figure 8:
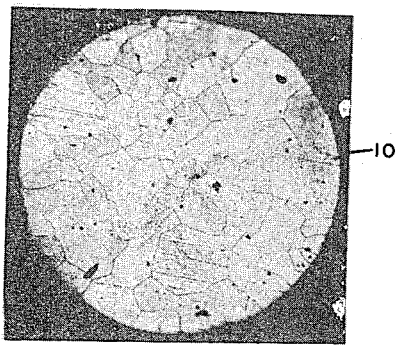

May 23, 1961     J. S. HILL     2,984,894
COMPOSITE MATERIAL
Filed Nov. 30, 1956     3 Sheets-Sheet 1
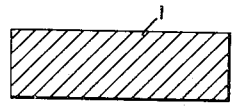
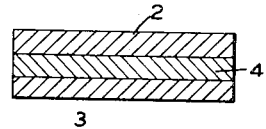
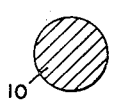
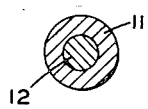
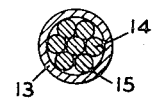
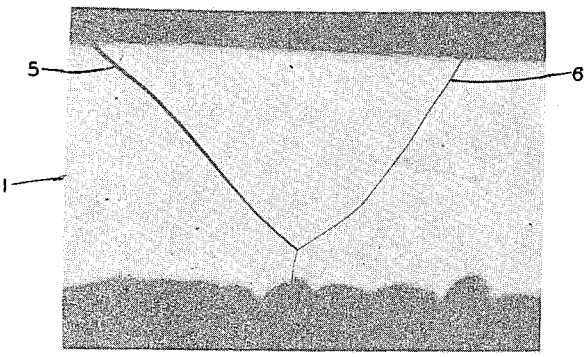
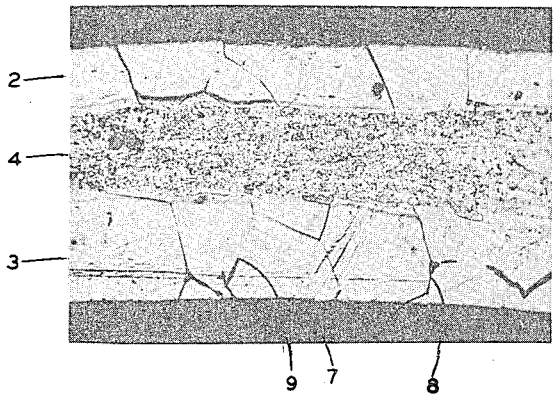
*INVENTOR.*
JAMES S. HILL
BY
ATTORNEY

INVENTOR.
JAMES S. HILL
ATTORNEY

United States Patent Office 2,984,894
Patented May 23, 1961

2,984,894

COMPOSITE MATERIAL

James S. Hill, Cranford, N.J., assignor, by mesne assignments, to Engelhard Industries, Inc., Newark, N.J., a corporation of Delaware Filed Nov. 30, 1956, Ser. No. 625,405

3 Claims. (Cl. 29—199)

The present invention deals with a composite material and more particularly with a composite metal having a plurality of metal layers and characterized by high strength under high temperature and corrosive conditions.

While composite metals of various combinations either in the form of plate, strips, wires, etc., are notoriously old for a variety of applications such as for thermostatic devices, jewelry, electrical elements, bearings, machine components, etc., there are certain instances where such composite materials as known are not desirably applicable. For example, in the case of crucibles, laboratory ware, glass handling apparatus, furnace windings, thermocouples, catalysts, etc., which are employed under high temperature and corrosive conditions, conventional composite metals either impart impurities to mediums employed in connection with the use of such composite materials, or otherwise the composite materials are subject to deterioration.

In such cases where substantially pure metals are desirable, for example for a crucible, especially platinum crucibles, the pure metal is subject to undesirable grain growth under high temperature corrosive conditions and the life of the crucible is undesirably limited. Particularly in the handling of molten glass it has been found that platinum crucibles containing molten glass are subject to grain growth of the platinum and that glass migrates along the grain boundaries thereof with the result that glass components actually pass through the crucible and are deposited on the outer walls of the crucible.

In the case of thermocouple wire having one thermocouple component composed of pure metal, because of certain desirable electrical characteristics, the wire metal is subject to grain growth and brittleness under high temperatures or in connection with corrosive conditions, and breakage results.

In the use of conventional composite metal for a glass handling part, the grain growth of the material may cause contamination of the glass by an undesirable metal transfer along the grain boundaries into the glass, especially when one component of the composite material is less resistant to attack by glass than the other component.

In the use of a conventional composite material for a thermocouple element, the electrical characteristics would be deleteriously affected.

In short, none of the composite materials heretofore known are adapted to provide the desirable properties of a substantially long life and improved strength under high temperature and corrosive conditions.

It is an object of the present invention to provide a composite material having the desirable properties of a substantially long life and improved strength under high temperature or high temperature and corrosive conditions. It is another object of the present invention to provide a composite material having the desirable properties of a substantially pure metal and which prolongs the useful life of the pure metal under high temperature conditions. Other objects and advantages of this invention will become apparent from the description hereinafter following, and the drawings forming a part hereof in which:

Figure 1 illustrates a cross sectional view of a conventional metal strip.

Figure 9:
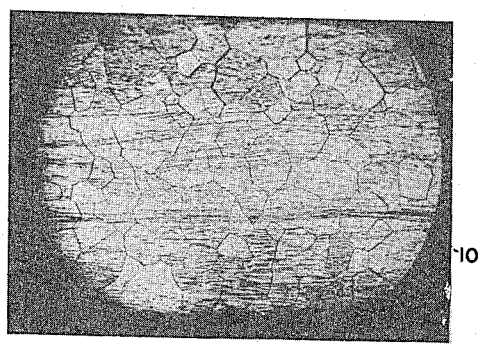
Figure 10:
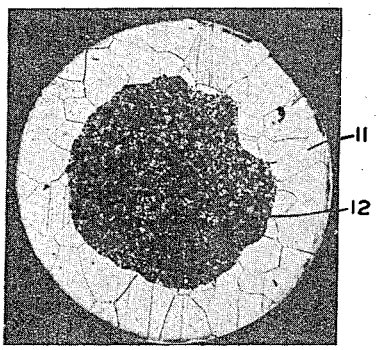
Figure 11:
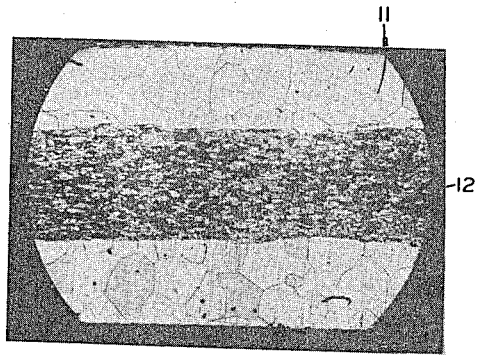
Figure 12:
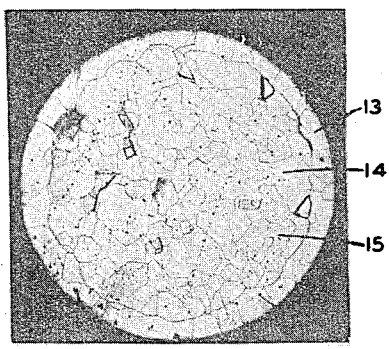
Figure 13:
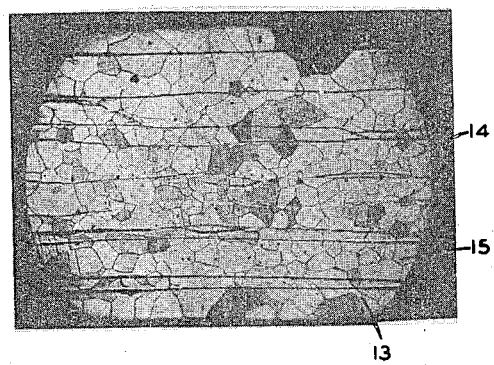
Figure 14:
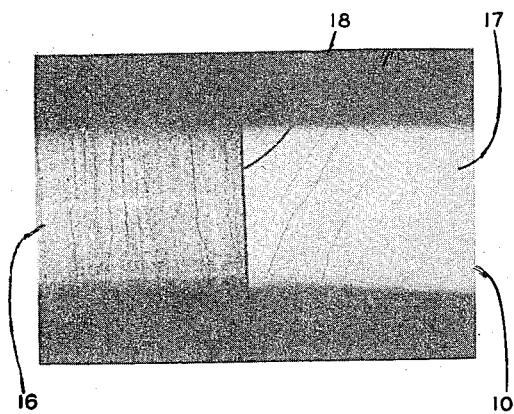
Figure 15:
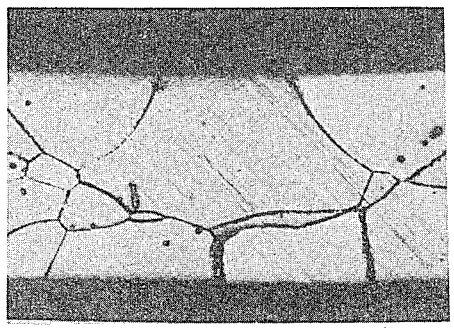

Figure 2 illustrates a cross sectional view of a composite metal strip according to this invention, Figure 3 illustrates a cross sectional view of a conventional metal wire, Figure 4 illustrates a cross sectional view of a composite wire according to the invention, Figure 5 illustrates a cross sectional view of a modified composite wire, Figure 6 illustrates a micrographic cross sectional view of a conventional metal strip, Figure 7 illustrates a micrographic cross sectional view of a composite metal strip according to this invention, Figure 8 illustrates a micrographic cross sectional view of a conventional metal wire, Figure 9 illustrates a micrographic longitudinal sectional view of Figure 8, Figure 10 illustrates a micrographic cross sectional view of a composite wire according to the invention, Figure 11 illustrates a micrographic longitudinal sectional view of Figure 10, Figure 12 illustrates a micrographic cross sectional view of a modified wire according to the invention, Figure 13 illustrates a micrographic longitudinal sectional view of Figure 12, Figure 14 illustrates a micrographic longitudinal sectional view of a wire as shown by Figures 3, 8, and 9 after subjecting the wire to high temperature corrosive conditions, and Figure 15 illustrates a micrographic longitudinal sectional view of a wire according to Figures 5, 12 and 13 after subjecting to high temperature corrosive conditions.

The present invention concerns the provision of a composite material which can be employed under conditions especially where heretofore only pure metals or substantially pure metals have been advantageously used, or where certain metals and metal alloys have been used but which metals and metal alloys as such have an undesirably short life under high temperature and corrosive operating conditions. The composite material herein contemplated is particularly adapted to retain the general characteristics of a metal or metal alloy in addition to improve strength by the combination of two metal layers, which combination of layers does not substantially detract from or adversely affect the characteristics of an essential metal forming a layer of the composite material.

For example, under conditions where metal such as a platinum group metal, gold, silver, copper, nickel, etc., is desirable because of the metal characteristics, but where such metal or alloys thereof suffers from an undesirably short life due to grain growth or deterioration under deleterious conditions, the invention contemplates the provision of such a composite material which retains the general characteristics of the above mentioned metals and imparts thereto additional longevity.

Figure 1 illustrates, schematically, a cross sectional view of a metal bar or strip I.

Figure 2 illustrates, schematically, a cross sectional view of a composite metal according to the invention and formed of two metal layers 2 and 3 with a powdered metal layer 4 bonded therebetween, said powdered metal layer consisting essentially of either the same metal composition as the layers 2 and 3 or of an alloy such that the major constituent of the layer 4 is of the same composition as the layers 2 and 3. For example, the layers 2 and 3 are composed of platinum and the powdered metal layer, in the form of a compacted or compacted and sintered layer, is composed of 95% platinum and 5% ruthenium. However, the metal layers may be formed of a metal of the platinum group and alloys thereof, and the powdered layer may be formed of a platinum group metal or alloys thereof with the powder composition preferably containing as a major portion the composition of the metal forming the major portion of the outer layers 2 and 3. In the preparation of the metal powder, especially in view of the large surface area and small particle size of the powder, the powder subjected to at least some oxidation whereby the powder layer has incorporated therewith a small amount of an oxide of the metal or metals.

Generally, the same principle applies to metals other than those mentioned above so long as the metal powder employed has a similar relationship to the outer layer as described with respect to the platinum group metals above exemplified.

For example, the composite material may be formed with two layers of copper having a powdered metal layer therebetween and with the powdered metal layer composed of from more than 50 percent to 99.5 percent copper together with at least one other metal such as tin, lead, aluminum, etc., and with from a trace up to about 10 percent of an oxide of the powdered constituents forming the powdered layer.

It is contemplated that other metals may be substituted for the copper so long as the composition ranges of such other metals correspond to the copper content above mentioned.

Figures 6 and 7 represent micrographic cross sectional views of the bars or strips shown by Figures 1 and 2 respectively. The micrographs represent 100×magnifications of the strips after being subjected to contact with molten opal glass for 24 hours in hydrogen at 1400° C. The metal of the strip 1 of Figure 6 is substantially pure platinum while the composite strip of Figure 7 is composed of two layers 2 and 3 of substantially pure platinum with platinum powder constituting the powder metal layer 4. It will be noted from Figure 6 that the platinum metal strip 1 is characterized by large grains as a result of grain growth, with the grain boundaries 5 and 6 extending entirely through the thickness of the strip and with diffusion of glass components between the grain boundaries. As a result, the strip 1 is not only brittle, but actually fractured throughout its thickness.

Regarding Figure 7, the grains of the platinum layers are not only smaller than that of Figure 6, as shown by boundaries 7, 8 and 9, but the platinum powder layer 4 is shown as an effective barrier and prevents grain growth throughout the thickness of the strip. The penetration of the platinum layer 3 by glass is shown by the dark enlargements along the grain boundary 8.

Figure 3 shows a cross-sectional view of a metal wire 10 composed, for example, of platinum, and Figures 8 and 9 are a micrographic cross-section and a micrographic longitudinal section, respectively, of the wire shown in Figure 3, annealed at 1300° C. for fifteen minutes.

Figure 4 shows a cross-sectional view of a composite metal wire having a sheath 11 composed, for example, of a platinum group metal, e.g., platinum, and a core 12 composed of compacted and sintered platinum powder or platinum-ruthenium powder or of a platinum group metal powder the major constituent of which is a metal identical to the metal composition of the sheath 11, or in the case of the metal sheath 11 being an alloy, then the major constituent of the powder composition corresponds to the major constituent of the sheath metal alloy.

Figures 10 and 11 are a micrographic cross-section and a micrographic longitudinal section, respectively, of the wire shown by Figure 4, the sheath being composed of platinum metal, annealed at 1300° C. for fifteen minutes. The core 12 is a compacted and sintered powder composed of 95 percent platinum and 5 percent ruthenium.

Figure 5 shows a cross-sectional view of a metal wire having a sheath 13 composed, for example, of a platinum group metal, e.g. platinum, and a core composed of a plurality of inner wires 14 and 15 having a composition such that the major constituent thereof corresponds in composition to that of the sheath 13, or if sheath 13 is an alloy, then the wires 14 and 15 have a composition such that the major constituent thereof corresponds in composition to the major constituent of the alloy. The wires 14 and 15 may advantageously be coated with an oxide film of aluminum oxide or, on the other hand, with an oxide of the metal or metals of which the wires are composed. While the wires 14 and 15 may be in the form of solid metal corresponding to that of the sheath 13, they are advantageously formed as wires of compacted and sintered metal powder having a composition which corresponds to the relationship set forth supra in connection with the composite material described.

The two forms of wires illustrated by Figures 3, 8 and 9 and Figures 5, 12 and 13, were hung over molten glass in a platinum boat in a hydrogen atmosphere for twelve days at 1400° C., and the results are illustrated by Figures 14 and 15. Figure 14 shows that the conventional wire 10 developed grain growth completely across the wire cross-section, with the grains 16 and 17 having not only regular grain structure, but grains having a continuous grain boundary 18 completely traversing the diameter of the wire. Figure 15 illustrates the effect of the barrier core formed by wires 14 and 15, whereby the grain growth was effectively retarded and with the grain boundaries being very irregular, whereby the wires possessed substantially greater tensile strength than the conventional wire.

While the composite metals herein described have been exemplified by a particular relationship between platinum group metals and platinum group metal powder as a core or intermediate layer, it is herein contemplated that other metals in a corresponding relationship may be employed within the scope of the appended claims.

What I claim is:

1. A composite material comprising first and second solid metal outer layers each consisting of at least one platinum group metal with a core bonded therebetween, the core consisting of compacted and sintered platinum group metal powder, whereby the composite material retains the characteristics of the solid metal layers and the powdered metal layer imparts thereto additional longevity under high temperature conditions.

2. A composite wire comprising a solid metal sheath consisting of at least one platinum group metal bonded to a core consisting of compacted and sintered platinum group metal powder, whereby the wire retains the characteristics of the sheath and the core imparts thereto additional longevity under high temperature conditions.

3. A composite wire according to claim 2, wherein the core comprises a plurality of compressed and sintered powder wires.

References Cited in the file of this patent

UNITED STATES PATENTS

| | | |
|---|---|---|
| 1,125,163 | Page | Jan. 19, 1913 |
| 1,336,449 | Trunk | Apr. 13, 1920 |
| 1,974,079 | Maier | Sept. 18, 1934 |
| 2,097,502 | Southgate | Nov. 2, 1937 |
| 2,319,240 | Larsen | May 18, 1943 |
| 2,319,364 | Ziegs | May 18, 1943 |
| 2,365,083 | Jarrett | Dec. 12, 1944 |
| 2,381,941 | Wellman | Aug. 14, 1945 |
| 2,486,341 | Stumbock | Oct. 25, 1949 |
| 2,657,796 | Leontis | Nov. 3, 1953 |
| 2,775,531 | Montgomery | Dec. 25, 1956 |
| 2,826,512 | Hoboken | Mar. 11, 1958 |